(12) United States Patent
Pfannkuchen et al.

(10) Patent No.: US 11,002,351 B2
(45) Date of Patent: May 11, 2021

(54) RANGE-CHANGE TRANSMISSION DEVICE

(71) Applicant: DAIMLER AG, Stuttgart (DE)

(72) Inventors: Ingo Pfannkuchen, Friedrichshafen (DE); Detlef Schnitzer, Denkendorf (DE); Frank Steffens, Ostfildern (DE); Jens Luckmann, Winnenden (DE)

(73) Assignee: DAIMLER AG, Stuttgart (DE)

( * ) Notice: Subject to any disclaimer, the term of this patent is extended or adjusted under 35 U.S.C. 154(b) by 70 days.

(21) Appl. No.: 16/472,535

(22) PCT Filed: Sep. 18, 2017

(86) PCT No.: PCT/EP2017/001098
§ 371 (c)(1),
(2) Date: Jun. 21, 2019

(87) PCT Pub. No.: WO2018/114017
PCT Pub. Date: Jun. 28, 2018

(65) Prior Publication Data
US 2019/0316664 A1 Oct. 17, 2019

(30) Foreign Application Priority Data
Dec. 22, 2016 (DE) ...................... 10 2016 015 302.4

(51) Int. Cl.
*F16H 37/04* (2006.01)
*F16H 3/54* (2006.01)
(52) U.S. Cl.
CPC ............ *F16H 37/046* (2013.01); *F16H 3/54* (2013.01); *F16H 2200/0039* (2013.01);
(Continued)

(58) Field of Classification Search
CPC ....... F16H 2200/264; F16H 2200/2094; F16H 2200/2005–2017;
(Continued)

(56) References Cited

U.S. PATENT DOCUMENTS 3,486,398 A * 12/1969 Waclawek ............ F16H 47/085
475/54
4,738,162 A 4/1988 Slotosch
(Continued)

FOREIGN PATENT DOCUMENTS

CH 446922 A 11/1967
DE 3535253 A1 4/1987
(Continued)

OTHER PUBLICATIONS

International Search Report dated Dec. 8, 2017 in related/corresponding International Application No. PCT/EP2017/001098.
(Continued)

*Primary Examiner* — David R Morris
*Assistant Examiner* — Lillian T Nguyen
(74) *Attorney, Agent, or Firm* — Patent Portfolio Builders PLLC

(57) ABSTRACT

A range-change transmission device includes a main shaft, an output shaft, and a range-change unit. The range-change unit has at least one planetary gearbox, which includes at least one first gearbox element, at least one second gearbox element, and at least one third gearbox element. The range-change unit also has at least one shifting device, which is provided at least for the selective connection of the main shaft to the first gearbox element and/or to the second gearbox element.

16 Claims, 2 Drawing Sheets

Figure 1:
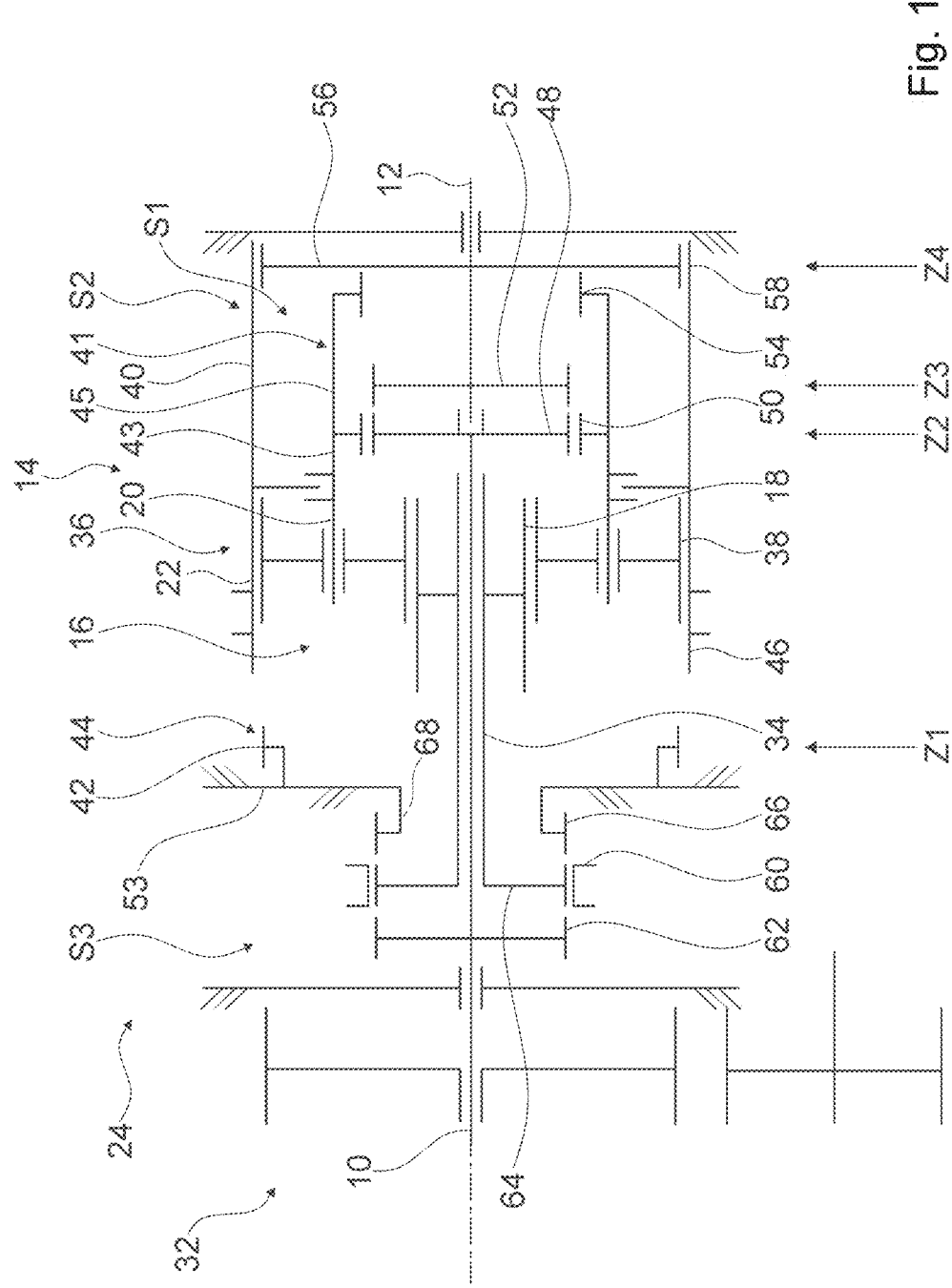

(52) U.S. Cl.
CPC ............... *F16H 2200/2005* (2013.01); *F16H 2200/2046* (2013.01); *F16H 2200/2064* (2013.01); *F16H 2200/2094* (2013.01)

(58) Field of Classification Search
CPC .................. F16H 2200/2035–2017; F16H 2200/003–0052; F16H 2200/2038–2061; F16H 37/042–046; F16H 3/54
See application file for complete search history.

(56) References Cited

U.S. PATENT DOCUMENTS

| | | | |
|---|---|---|---|
| 8,051,732 B2 | 11/2011 | Gitt | |
| 8,668,616 B2 | 3/2014 | Robinette | |
| 2010/0029436 A1* | 2/2010 | Katsuta | B60W 10/08 477/5 |
| 2014/0038762 A1 | 2/2014 | Wechs | |
| 2015/0219193 A1* | 8/2015 | Nitsch | F16H 37/046 475/219 |
| 2015/0267779 A1* | 9/2015 | Kaltenbach | F16H 3/62 475/276 |
| 2016/0061304 A1* | 3/2016 | Kaltenbach | F16H 3/66 475/5 |
| 2017/0089429 A1* | 3/2017 | Slapak | F16H 37/042 |
| 2018/0112747 A1* | 4/2018 | Warth | F16H 3/663 |
| 2018/0306280 A1* | 10/2018 | Beck | F16H 3/66 |

FOREIGN PATENT DOCUMENTS

| | | |
|---|---|---|
| DE | 3829550 A1 | 3/1990 |
| DE | 102005044068 A1 | 3/2007 |
| DE | 102009048263 A1 | 4/2011 |
| DE | 102010033590 A1 | 2/2012 |
| DE | 102012204993 A1 | 10/2012 |
| DE | 102012213711 A1 | 2/2014 |
| WO | 2015183153 A1 | 12/2015 |

OTHER PUBLICATIONS

Search Report dated Jun. 19, 2017 in related/corresponding DE Application No. 10 2016 015 302.4.
Written Opinion dated Dec. 8, 2017 in related/corresponding International Application No. PCT/EP2017/001098.

* cited by examiner

RANGE-CHANGE TRANSMISSION DEVICE

BACKGROUND AND SUMMARY OF THE INVENTION

Exemplary embodiments of the invention relate to a range-change transmission device and a method for operating a range-change transmission device.

A range-change transmission device is already known from DE 10 2005 044 068 A1, which device has a main group comprising a main shaft and a range group, the range group comprising a planetary transmission, the sun wheel of which is permanently connected to the main shaft for conjoint rotation.

Exemplary embodiments of the invention are directed a range-change transmission device having improved properties with regard to efficiency, in particular shifting efficiency and energy efficiency.

According to an embodiment, a range-change transmission device comprises a main shaft, an output shaft and a range group having at least one planetary transmission that comprises at least one first transmission element, at least one second transmission element and at least one third transmission element.

The range group has at least one shifting device provided at least for optionally connecting the main shaft to at least the first transmission element and/or at least to the second transmission element.

"Range-change transmission device" is understood in particular to mean at least one part of a range-change transmission. Alternatively, the range-change transmission device can completely form the range-change transmission. In particular, the range-change transmission device has a main group comprising the main shaft. The main group can in particular comprise a plurality of gears. A "range group" is understood in particular to mean a downstream transmission connected downstream of the main group preferably on the output side and which is provided in particular for at least doubling a total number of gears of a group transmission. "Provided" is understood in particular to mean specially designed and/or equipped. An object being provided for a particular function is understood in particular to mean that the object fulfils and/or carries out this particular function in at least one use and/or operating state. "Planetary transmission" is understood in particular to mean a unit comprising at least one planetary gear set, preferably comprising precisely one planetary gear set. Alternatively, or additionally, the planetary transmission can be multi-stage and preferably comprises a plurality of planetary gear sets. A "planetary gear set" is understood in this context in particular to mean a unit comprising a transmission element designed as a sun wheel, comprising a transmission element designed as a ring gear, comprising a transmission element designed as a planet carrier and comprising a plurality of transmission elements designed as planet gears, the transmission elements designed as planet gears of the transmission element designed as a planet carrier being arranged on a circular path around the transmission element designed as a sun wheel.

A "shifting device" is understood in this context in particular to mean a device comprising at least one shifting unit, in particular at least two shifting units, preferably at least three shifting units, and particularly preferably precisely three shifting units. A "shifting unit" is understood in this context in particular to mean a unit comprising at least two coupling elements and at least one shifting element that is provided for establishing a shiftable connection between the at least two coupling elements. A "shifting element" of a shifting unit is understood in particular to mean an element that is permanently connected to one of the coupling elements for conjoint rotation but so as to be axially and/or radially movable and is provided for a frictional, force-fit and/or form-fit connection to at least one further element of the coupling elements, such as a sliding sleeve of a form-fitting unit or an axially movable friction disk of a frictional shifting unit. A "coupling element" is understood in particular to mean an element of the shifting unit that is permanently connected to a transmission element, for example a transmission shaft, an idler gear and/or a fixed gear, for conjoint rotation, which is preferably axially and radially fixed and which is provided in particular for a frictional, force-fit and/or form-fit connection to the shifting element, such as an idler gear that has toothing for connecting to the shifting element, or a disk carrier of a frictional shifting unit. A "shifting unit comprising three coupling elements" is understood in particular to mean a shifting unit in which the shifting element is provided for shiftably connecting a denoted shifting element, which in the following is also connected as a synchronization body, to at least one of the two other coupling elements in each case or for decoupling said element therefrom. A "fixed gear" is understood in this case in particular to mean a gearwheel that is permanently connected to the main shaft, an intermediate shaft or the output shaft for conjoint rotation. An "idler gear" is understood in particular to mean a single gearwheel that is rotatably arranged with respect to a shaft and is permanently connected to at least one coupling element of at least one shifting unit for conjoint rotation. "Optional connection" is understood in particular to mean a temporarily non-rotatable connection of at least two components. "Connecting" is understood in particular to mean establishing a non-rotatable connection, which is preferably dependent on a shifting state of at least one shifting device and/or shifting unit.

The shifting device is also provided for optionally connecting the output shaft to the second transmission element and/or to the third transmission element. This can increase shifting variety.

The shifting device also comprises at least one shifting unit which, in a first shifting state, connects the main shaft to the second transmission element and/or, in a second shifting state, connects the output shaft to the second transmission element. This can increase shifting variety.

The shifting device also comprises at least one further shifting unit which, in a first shifting state, connects the output shaft to the third transmission element and/or, in a second shifting state, fixes the third transmission element. This can further increase shifting variety.

It is conceivable for the shifting states of the shifting unit and the further shifting unit to be independent from one another. In order to simplify a shifting process and achieve in particular synchronization of shifting processes, in one preferred embodiment of the invention at least one shifting state of the shifting unit is coupled to at least one shifting state of the further shifting unit. In particular, the first shifting state of the shifting unit is coupled to the first shifting state of the further shifting unit. Moreover, in particular the second shifting state of the shifting unit is coupled to the second shifting state of the further shifting unit. Alternatively, it would also be conceivable for the first shifting state of the shifting unit to be coupled to the second shifting state of the further shifting unit and/or for the second shifting state of the shifting unit to be coupled to the first shifting state of the further shifting unit. "Coupled shifting states" are understood in particular to mean shifting states occurring at least temporarily and are preferably mutually interdependent.

In order to advantageously couple shifting states, the shifting unit is connected to the further shifting unit so as to be axially fixed. The shifting unit is in particular also mounted so as to be rotatable relative to the further shifting unit.

Moreover, the at least one shifting unit, in particular the aforementioned shifting unit and the aforementioned further shifting unit, of the shifting device is provided at least for a form-fit connection. Alternatively, or additionally, a frictional connection is also conceivable. This can advantageously improve a connection, to the effect that powershift selection is given. Wear can also therefore be reduced.

Moreover, in particular for optional connection, at least one of the transmission elements, in particular the second transmission element and/or the third transmission element, can be moved axially by means of at least one shifting unit, in particular the shifting unit and/or the further shifting unit.

The shifting device also comprises at least one additional shifting unit which, in a first shifting state, connects the main shaft to the first transmission element and/or, in a second shifting state, fixes the first transmission element. This can advantageously increase shifting variety.

In a particularly preferred embodiment of the invention, the first transmission element is designed as a sun wheel. More advantageously, the second transmission element is designed as a planet carrier. The third transmission element is particularly preferably designed as a ring gear. This can advantageously produce a particularly compact arrangement of the planetary transmission and, in particular, installation space can be saved.

The range group also has at least one first gearwheel plane arranged on the drive side relative to a planetary gear set of the planetary transmission and which is provided for connecting the third transmission element so as to be fixed to the housing. As a result, the third transmission element can be simply fixed, without shifting flexibility of the range-change transmission device being restricted.

The range group also has at least one second gearwheel plane arranged on the output side relative to the planetary gear set of the planetary transmission and which is provided for connecting the second transmission element to the main shaft for conjoint rotation. In particular, the planetary gear set is arranged between the first gearwheel plane and the second gearwheel plane. This can produce a compact arrangement of the range group.

The range group also has at least one third gearwheel plane arranged on the output side relative to the planetary gear set of the planetary transmission and which is provided for connecting the second transmission element to the output shaft for conjoint rotation. In particular, the third gearwheel plane is arranged on the output side relative to the second gearwheel plane. The second gearwheel plane is preferably arranged between the planetary gear set and the third gearwheel plane. As a result, the range-change transmission device can be particularly compact.

The range group also has at least one fourth gearwheel plane arranged on the output side relative to the planetary gear set of the planetary transmission and which is provided for connecting the third transmission element to the output shaft for conjoint rotation. In particular, the fourth gearwheel plane is arranged on the output side relative to the third gearwheel plane. The third gearwheel plane is preferably arranged between the second gearwheel plane and the fourth gearwheel plane.

In a further aspect of the invention, a method for operating the range-change transmission device comprising the range group is proposed, in which method optionally a main shaft is connected to at least one first transmission element of a planetary transmission and/or the main shaft is connected to a second transmission element of the planetary transmission. This can produce a particularly efficient shifting process.

Moreover, at least one of the transmission elements is synchronized with the main shaft before connection. Component wear can advantageously be reduced as a result.

Further advantages can be found in the following description of the drawings. An exemplary embodiment of the invention is shown in the drawings. The drawings, the description of the drawings and the claims contain numerous features in combination. A person skilled in the art will expediently also consider the features individually and combine them to form meaningful further combinations.

BRIEF DESCRIPTION OF THE DRAWING FIGURES

Figure 2:
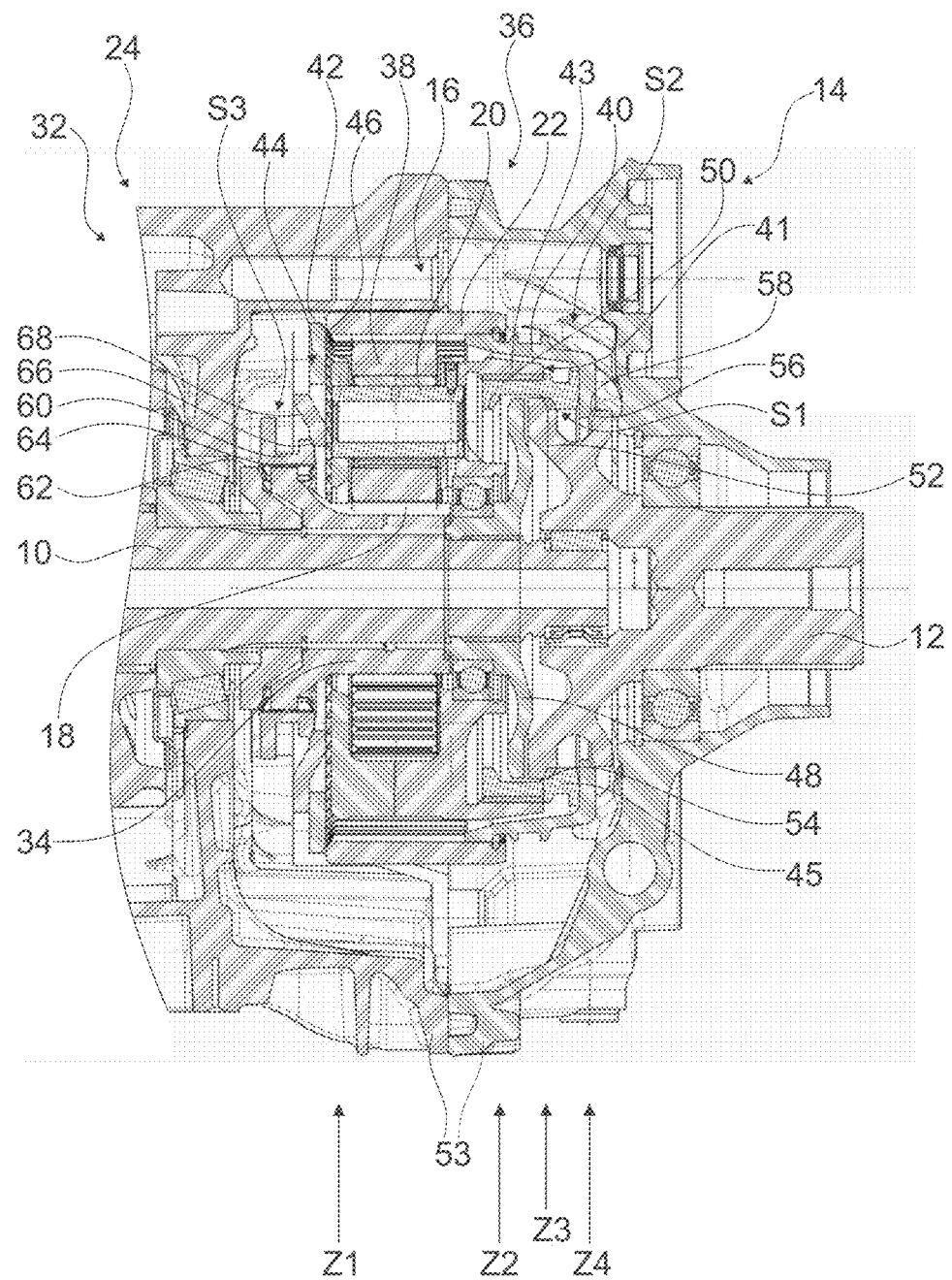

In the drawings:

FIG. 1 is a transmission diagram of a range-change transmission device according to the invention for a heavy goods vehicle and FIG. 2 is a sectional view through a range-change transmission device according to the invention.

DETAILED DESCRIPTION

FIG. 1 shows a range-change transmission device. The range-change transmission device comprises a main group 32. The main group 32 is provided, in terms of design, for shifting a plurality of transmission gears, which are not described in greater detail. The range-change transmission device has a range group 14. The range group 14 is connected downstream of the main group 32 on the output side. The range group 14 is provided, in terms of design, for shifting at least three range group gears V1-V3.

The main group 32 comprises a main shaft 10. The main shaft 10 can be designed as a solid shaft or as a hollow shaft. The range group 14 also has an intermediate shaft 34. The intermediate shaft 34 is designed as a hollow shaft. The intermediate shaft 34 is rotatably mounted on the main shaft 10. The range group 14 has an output shaft 12. The output shaft 12 is rotatably mounted on the main shaft 10. Alternatively, the output shaft 12 can only be mounted on the housing 53. In the present case, the output shaft 12 is designed, in regions, as a hollow shaft for mounting on the main shaft 10 (cf. FIG. 2).

The range group 14 has a planetary transmission 36. The planetary transmission 36 comprises at least one planetary gear set 16. The planetary gear set 16 comprises a first transmission element 18. The first transmission element 18 is designed as a sun wheel. The first transmission element 18 is permanently connected to the intermediate shaft 34 for conjoint rotation. The first transmission element 18 is advantageously integral with the intermediate shaft 34. The intermediate shaft 34 forms a sun shaft. In the present case, the planetary transmission 36 comprises precisely one planetary gear set 16. Alternatively, or additionally, the planetary transmission 36 could also comprise a plurality of planetary gear sets 16.

The planetary transmission 36 comprises a second transmission element 20. The second transmission element 20 is designed as a planet carrier. The second transmission element 20 is designed as a planet carrier for mounting planet gears 38 of the planetary gear set 16. In the embodiment in FIG. 1, the second transmission element 20 is mounted so as to be axially movable, such that the second transmission element 20 can be moved axially relative to the first transmission element 18. In the particularly preferred embodiment in FIG. 2, however, the second transmission element 20 is arranged so as to be axially fixed with respect to the first transmission element 18.

The planetary gear set 16 has a third transmission element 22. The third transmission element 22 is designed as a ring gear. The planetary transmission 36 also has a transmission element support 40. The transmission element support 40 is provided as a support for the third transmission element 22. It is conceivable for the third transmission element 22 and the transmission element support 40 to be integrally interconnected. The third transmission element 22 can be moved axially relative to the first transmission element 18. The third transmission element 22 is mounted such that it can be moved axially by the second transmission element 30.

The range group 14 comprises at least four gearwheel planes Z1-Z4, specifically in particular a first gearwheel plane Z1, a second gearwheel plane Z2, a third gearwheel plane Z3 and a fourth gearwheel plane Z4.

The first gearwheel plane Z1 is arranged on the drive side relative to the planetary gear set 16. The first gearwheel plane Z1 is provided for connecting the third transmission element 22 so as to be fixed to the housing. The third transmission element 22 can be moved axially, at least in part, into the first gearwheel plane Z1. The first gearwheel plane Z1 has external toothing 42. The external toothing 42 is permanently connected so as to be fixed to the housing. The external toothing 42 is advantageously formed by a retaining plate 44 that is fixedly connected to a housing 53 of the range-change transmission device. The third transmission element 22 can be connected to the external toothing 42 of the first gearwheel plane Z1. The third transmission element 22 has internal toothing 46. By means of the internal toothing 46, the third transmission element 22 can be connected to the external toothing 42 of the first gearwheel plane Z1. In order to connect to the external toothing 42, the third transmission element 22 can be moved axially at least in part into the first gearwheel plane Z1.

The second gearwheel plane Z2 is arranged on the output side relative to the planetary gear set 16. The second gearwheel plane Z2 is also arranged on the output side relative to the first gearwheel plane Z1. The planetary gear set 16 is arranged between the first gearwheel plane Z1 and the second gearwheel plane Z2. The second gearwheel plane Z2 is provided for connecting the second transmission element 20 to the main shaft 10 for conjoint rotation. The second gearwheel plane has a fixed gear 48. The fixed gear 48 is permanently connected to the main shaft 10 for conjoint rotation. The second transmission element 20 can be connected to the fixed gear 48 of the second gearwheel plane Z2. The planetary transmission 36 comprises a connecting support 41. The connecting support 41 has internal toothing 50. The second transmission element 20 can be connected to the fixed gear 48 by means of the internal toothing 50. In order to connect to the fixed gear 48, the connecting support 41 can be axially moved at least in part into the second gearwheel plane Z2. The connecting support 41 is formed in two parts. The connecting support 41 has a further transmission element support 43, which is permanently connected to the second transmission element 20 for conjoint rotation. In particular, the further transmission element support 43 could be integrally connected to the second transmission element 20. The connecting support 41 also has a sliding sleeve 45. The connecting support 45 has the internal toothing 50. The sliding sleeve 45 can, as shown in FIG. 1, be connected to the transmission element 20 so as to be axially fixed and for conjoint rotation. As shown in FIG. 2, the sliding sleeve 45 is particularly advantageously non-rotatably arranged but so as to be axially movable with respect to the transmission element 20, such that only the sliding sleeve 45 comprising the toothing thereof has to be moved during shifting and not the transmission element 20.

The third gearwheel plane Z3 is arranged on the output side relative to the planetary gear set 16. The third gearwheel plane Z3 is arranged on the output side relative to the second gearwheel plane Z2. The second gearwheel plane Z2 is arranged between the planetary gear set 16 and the third gearwheel plane Z3. The third gearwheel plane Z3 is provided for connecting the second transmission element 20 to the output shaft 12 for conjoint rotation. The third gearwheel plane Z3 has a fixed gear 52. The fixed gear 52 is permanently connected to the output shaft 12 for conjoint rotation. The fixed gear 52 is advantageously integrally connected to the output shaft 12. The second transmission element 22 can be connected to the fixed gear 52 of the third gearwheel plane Z3. The connecting support 41 has further internal toothing 54. The second transmission element 20 can be connected to the fixed gear 52 by means of the further internal toothing 54. In order to connect to the fixed gear 52, the connecting support 41 can be axially moved at least in part into the second gearwheel plane Z2.

The fourth gearwheel plane Z4 is arranged on the output side relative to the planetary gear set 16. The fourth gearwheel plane Z4 is arranged on the output side relative to the third gearwheel plane Z3. The third gearwheel plane Z3 is arranged between the second gearwheel plane Z2 and the fourth gearwheel plane Z4. The fourth gearwheel plane Z4 is provided for connecting the third transmission element 22 to the output shaft 12 for conjoint rotation. The fourth gearwheel plane Z4 has a fixed gear 56. The fixed gear 56 is permanently connected to the output shaft 12 for conjoint rotation. The fixed gear 56 is permanently connected to the fixed gear 52 of the third gearwheel plane Z3 for conjoint rotation. The fixed gear 56 is advantageously integrally connected to the output shaft 12 and/or to the fixed gear 52 of the third gearwheel plane Z3. The third transmission element 22 can be connected to the fixed gear 56 of the fourth gearwheel plane Z4. The transmission element support 40 has internal toothing 58. The third transmission element 22 can be connected to the fixed gear 56 by means of the internal toothing 58. In order to connect to the fixed gear 56, the further transmission element support 43 can be axially moved at least in part into the fourth gearwheel plane Z4.

The range group 14 comprises a shifting device 24. The shifting device 24 is provided at least for optionally connecting the main shaft 10 to at least the first transmission element 18 and/or to the second transmission element 20. The shifting device 24 is also provided for optionally connecting the output shaft 12 to the second transmission element 20 and/or for connecting the output shaft 12 to the third transmission element 22.

The shifting device 24 has three shifting units S1-S3, specifically a shifting unit S1, a further shifting unit S2 and an additional shifting unit S3. The shifting units S1-S3 are provided at least for a form-fit shift. Alternatively, or additionally, the shifting units S1-S3 are provided for a frictional shift. The shifting device 24 is provided for synchronizing components to be connected before they are interconnected.

The sliding sleeve 45 can be moved axially by means of the shifting unit S1. The shifting unit S1 has a first shifting state. In the first shifting state, the shifting unit S1 connects the output shaft 12 to the second transmission element 20. The shifting unit S1 also has a second shifting state. In the second shifting state, the shifting unit S1 connects the main shaft 10 to the second transmission element 20. The shifting unit S1 has the sliding sleeve 45 as a shifting element. The shifting unit S1 has first coupling elements, specifically the internal toothing 50 and the fixed gear 48 of the second gearwheel plane Z2, which are interconnected in the first shifting state. The shifting unit S1 has second coupling elements, specifically the further internal toothing 54 and the fixed gear 52 of the third gearwheel plane Z3, which are interconnected in the second shifting state.

The third transmission element 22 can be moved axially by means of the further shifting unit S2. The embodiment shown, comprising the transmission element 22 designed as a sliding ring gear, is extremely space-saving and functionally optimized.

The further shifting unit S2 has a first shifting state. In the first shifting state, the further shifting unit S2 fixes the third transmission element 22. The further shifting unit S2 also has a second shifting state. In the second shifting state, the further shifting unit S2 connects the output shaft 12 to the third transmission element 22. The shifting unit S2 has the sliding sleeve 45 as a shifting element. The further shifting unit S2 has first coupling elements, specifically the internal toothing 46 and the external toothing 42 of the first gearwheel plane Z1, which are interconnected in the first shifting state. The further shifting unit S2 has second coupling elements, specifically the internal toothing 58 and the fixed gear 56 of the fourth gearwheel plane Z4, which are interconnected in the second shifting state.

The shifting unit S1 is connected to the further shifting unit S2 so as to be axially fixed. In particular, the sliding sleeve 45 is connected to the transmission element support 40 so as to be axially fixed. The first shifting state of the shifting unit S1 is coupled to at least one shifting state of the further shifting unit S2. Moreover, the second shifting state of the shifting unit S1 is coupled to the second shifting state of the further shifting unit S2.

The additional shifting unit S3 is arranged on the drive side upstream of the first gearwheel plane Z1. The additional shifting unit S3 has a sliding sleeve 60 as a shifting element. The additional shifting unit S3 has a fixed gear 62 as a first coupling element. The fixed gear 62 is permanently connected to the main shaft 10 for conjoint rotation. The fixed gear 62 can advantageously be integral with the main shaft 10. The additional shifting unit S3 has a further fixed gear 64 as a second coupling element. The further fixed gear 64 is permanently connected to the intermediate shaft 34 for conjoint rotation. The further fixed gear 64 can advantageously be integral with the intermediate shaft 34. The additional shifting unit S3 has internal toothing 66 as a third coupling element. The internal toothing 66 is permanently connected so as to be fixed to the housing. The internal toothing 66 is advantageously formed by a retaining plate 68 which is fixedly connected to a housing 53 of the range-change transmission device.

The additional shifting unit S3 has a first shifting state. In the first shifting state, the additional shifting unit S3 connects the main shaft 10 to the first transmission element 18. For this purpose, the shifting element connects the first coupling element to the second coupling element for conjoint rotation. The additional shifting unit S3 also has a second shifting state. In the second shifting state, the additional shifting unit S3 fixes the first transmission element 18. For this purpose, the shifting element connects the second coupling element to the third coupling element for conjoint rotation. The additional shifting unit S3 also has a third shifting state. In the third shifting state, the shifting element does not couple any of the coupling elements to one another.

A range group gear V1 is produced from a combination of the first shifting state of the shifting unit S1, the first shifting state of the further shifting unit S2, and the first shifting state of the additional shifting unit S3. The range group gear V1 is a slow gear in which the output shaft 12 rotates more slowly than the main shaft 10.

A range group gear V2 is produced from a combination of the second shifting state of the shifting unit S1, the second shifting state of the further shifting unit S2, and the first shifting state of the additional shifting unit S3. The range group gear V2 is a middle gear in which the output shaft 12 rotates as quickly as the main shaft 10.

A range group gear V3 is produced from a combination of the second shifting state of the shifting unit S1, the second shifting state of the further shifting unit S2, and the second shifting state of the additional shifting unit S3. The range group gear V3 is a fast gear in which the output shaft 12 rotates faster than the main shaft 10.

A parking brake position, in which the planetary transmission 36 is blocked, is produced from a combination of the first shifting state of the shifting unit S1, the first shifting state of the further shifting unit S2, and the second shifting state of the additional shifting unit S3.

A neutral position is produced from a combination of the first shifting state of the shifting unit S1, the first shifting state of the further shifting unit S2, and the third shifting state of the additional shifting unit S3. A neutral position is also produced from the combination of the second shifting state of the shifting unit S1, the second shifting state of the further shifting unit S2, and the third shifting state of the additional shifting unit S3.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 10 main shaft
12 output shaft
14 range group
16 planetary gear set
18 first transmission element
20 second transmission element
22 third transmission element
24 shifting device 32 main group
34 intermediate shaft
36 planetary transmission
38 planet gear
40 transmission element support
41 connecting support
42 external toothing
43 further transmission element support
44 retaining plate
45 sliding sleeve
46 internal toothing
48 fixed gear
50 internal toothing
52 fixed gear
53 housing
54 further internal toothing
56 fixed gear
58 internal toothing
60 sliding sleeve
62 fixed gear
64 further fixed gear
66 internal toothing
68 retaining plate
S1 shifting unit
S2 further shifting unit
S3 additional shifting unit
Z1 first gearwheel plane
Z2 second gearwheel plane
Z3 third gearwheel plane
Z4 fourth gearwheel plane

The invention claimed is:

1. A range-change transmission device, comprising:
a main shaft;
an output shaft arranged coaxially with respect to the main shaft; and
a range group, comprising
at least one planetary transmission comprising at least one first transmission element, at least one second transmission element and at least one third transmission element; and
at least one shifting device configured to alternatively connect the main shaft to the first transmission element and to the second transmission element, the at least one shifting device comprising
at least one shifting unit which, in a first shifting state, is configured to connect the main shaft to the second transmission element and, in a second shifting state, is configured to connect the output shaft to the second transmission element; and
at least one further shifting unit which, in a first shifting state, is configured to connect the output shaft to the third transmission element,
wherein at least one shifting state of the at least one shifting unit is coupled to at least one shifting state of the at least one further shifting unit.

2. The range-change transmission device of claim 1, wherein the at least one shifting device is configured to connect the output shaft to the second transmission element or to the third transmission element.

3. The range-change transmission device of claim 1, wherein the at least one further shifting unit, in a second shifting state, is configured to fix the third transmission element.

4. The range-change transmission device of claim 1, wherein the at least one shifting unit is connected to the at least one further shifting unit so as to be axially fixed.

5. The range-change transmission device of claim 1, wherein the at least one shifting unit of the shifting device is configured to at least for a form-fit shift.

6. The range-change transmission device of claim 1, wherein at least one of the second and third transmission elements is configured to be moved axially by the at least one shifting unit.

7. The range-change transmission device of claim 1, wherein the at least one shifting device has at least one additional shifting unit which, in a first shifting state, is configured to connect the main shaft to the first transmission element and/or, in a second shifting state, is configured to fix the first transmission element.

8. The range-change transmission device of claim 1, wherein the first transmission element is a sun wheel.

9. The range-change transmission device of claim 1, wherein the second transmission element is a planet carrier.

10. The range-change transmission device of claim 1, wherein the third transmission element is a ring gear.

11. The range-change transmission device of claim 1, wherein the range group has at least one first gearwheel plane arranged on a drive side relative to a planetary gear set of the at least one planetary transmission and which is configured to connect the third transmission element so as to be fixed to a housing.

12. The range-change transmission device of claim 11, wherein the range group has at least one second gearwheel plane arranged on an output side relative to a planetary gear set of the at least one planetary transmission and which is configured to connect the second transmission element to the main shaft for conjoint rotation.

13. The range-change transmission device of claim 12, wherein the range group has at least one third gearwheel plane arranged on the output side relative to a planetary gear set of the at least one planetary transmission and which is configured to connect the second transmission element to the output shaft for conjoint rotation.

14. The range-change transmission device of claim 13, wherein the range group has at least one fourth gearwheel plane arranged on the output side relative to a planetary gear set of the planetary transmission and which is configured to connect the third transmission element to the output shaft for conjoint rotation.

15. A method for operating a range-change transmission device, which comprises a main shaft; an output shaft arranged coaxially with respect to the main shaft; and a range group, comprising at least one planetary transmission comprising at least one first transmission element, at least one second transmission element and at least one third transmission element; and at least one shifting device configured to alternatively connect the main shaft to the first transmission element and to the second transmission element, the at least one shifting device comprising at least one shifting unit which, in a first shifting state, is configured to connect the main shaft to the second transmission element and, in a second shifting state, is configured to connect the output shaft to the second transmission element; and at least one further shifting unit which, in a first shifting state, is configured to connect the output shaft to the third transmission element, wherein at least one shifting state of the at least one shifting unit is coupled to at least one shifting state of the at least one further shifting unit, the method comprising:
forming a slow gear by coupling the output shaft to the second transmission element using the at least one shifting unit and by fixing the third transmission element using the at least one further shifting unit and by coupling the main shaft to the first transmission element using at least one additional shifting unit.

16. The method for operating a range-change transmission device of claim 15, the method further comprising:
forming a fast gear by coupling the main shaft to the second transmission element using the at least one shifting unit and by coupling the output shaft to the third transmission element using the at least one further shifting unit and by braking the first transmission element using the at least one additional shifting unit.

* * * * *